(12) United States Patent
Veligdan et al.

(10) Patent No.: US 6,948,820 B2
(45) Date of Patent: Sep. 27, 2005

(54) INTERACTIVE DISPLAY SYSTEM HAVING AN OPTICAL CHANNELING ELEMENT

(75) Inventors: James T. Veligdan, Manorville, NY (US); Leonard DeSanto, Dunkirk, MD (US)

(73) Assignee: Scram Technologies, Inc., Dunkirk, MD (US)

( * ) Notice: Subject to any disclaimer, the term of this patent is extended or adjusted under 35 U.S.C. 154(b) by 0 days.

(21) Appl. No.: 10/650,889

(22) Filed: Aug. 28, 2003

(65) Prior Publication Data

US 2005/0046805 A1 Mar. 3, 2005

(51) Int. Cl.[7] .................. G03B 21/14; G03B 21/00; G02B 6/04; H04N 5/66
(52) U.S. Cl. .................. 353/38; 353/42; 385/120; 348/804
(58) Field of Search ............. 349/5, 7, 12, 16, 349/58, 61–65; 353/38, 42, 122; 385/120; 359/456, 457, 460; 348/14.05, 804, 14.03

(56) References Cited

U.S. PATENT DOCUMENTS

| | | | |
|---|---|---|---|
| 5,381,502 A | 1/1995 | Veligdan | |
| 5,455,882 A | * 10/1995 | Veligdan | 385/116 |
| 6,175,679 B1 | * 1/2001 | Veligdan et al. | 385/120 |
| 6,222,971 B1 | 4/2001 | Veligdan et al. | |
| 6,301,417 B1 | 10/2001 | Biscardi et al. | |
| 6,400,876 B1 | 6/2002 | Biscardi et al. | |
| 6,519,400 B2 | 2/2003 | Biscardi et al. | |
| 6,535,674 B2 | 3/2003 | Veligdan | |
| 2003/0043350 A1 | * 3/2003 | Kitazawa | 353/122 |
| 2004/0075820 A1 | * 4/2004 | Chu et al. | 353/122 |

* cited by examiner

Primary Examiner—Judy Nguyen
Assistant Examiner—Andrew Sever
(74) Attorney, Agent, or Firm—Reed Smith LLP; William J. McNichol, Jr.; Matthew J. Esserman

(57) ABSTRACT

A display system includes a waveguide optical panel having an inlet face and an opposite outlet face. A projector and imaging device cooperate with the panel for projecting an image thereon. An optical detector is located near the panel for detecting a location on the outlet face of an inbound light spot. The inbound light is channeled to the detector which may be of a reduced size.

49 Claims, 3 Drawing Sheets

INTERACTIVE DISPLAY SYSTEM HAVING AN OPTICAL CHANNELING ELEMENT

BACKGROUND OF THE INVENTION

The present invention relates generally to optical waveguides, and, more specifically, to optical panels formed therefrom.

U.S. Pat. No. 5,381,502 discloses a polyplanar optical display (POD) including ribbon optical waveguides laminated together. Image light is projected through an inlet face of the display for total internal reflection therein, with a video image being displayed at an opposite outlet face end of the panel.

U.S. Pat. No. 5,455,882 discloses another form of a POD panel configured for interactive operation. The video image is projected outbound through the stacked waveguides, and an interactive light beam may be directed inbound through the outlet face toward the inlet face for detection of its screen position for providing interactive capability.

In both patents, the similarly configured optical panels permit light transmission in either direction from the inlet face to the opposite outlet face, or from the outlet face to the opposite inlet face. This capability permits the use of the optical panels in various applications for providing high definition viewing screens for televisions, computer monitors, and various other types of viewing screens as desired.

Typically, detection of the inbound light for interactive capability may be effected using a conventional linear array of photodiodes. The array is sized in length to bridge the entire stack of waveguides for detecting inbound light in each waveguide for determining the corresponding position thereof. However, the cost of the array increases with the required total length thereof, and correspondingly increases the associated cost of the optical display which is a significant factor in competitive marketing thereof.

Furthermore, another advantage of the POD panels is their relative light weight notwithstanding the relatively large sizes in which they may be made. A panel having a diagonal measure of one to two meters, for example, has a correspondingly large viewing screen over which a correspondingly large area of interactive capability may be effected. Detecting inbound light for interactive capability typically requires correspondingly long arrays of photodiodes for effectively covering the entire viewing screen.

Accordingly, it is desired to provide a display system having interactive capability with corresponding advantages in implementation.

BRIEF SUMMARY OF THE INVENTION

A display system of the present invention includes a waveguide optical panel having an inlet face and an opposite outlet face. A projector and imaging device cooperate with the panel for projecting an image through the panel for display on the outlet face. An optical detector is located near the panel for detecting a location on the outlet face of an inbound light spot. At least a portion of the inbound light spot is channeled to the detector which may be of a reduced size.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE PREFERRED EMBODIMENTS

Figure 1:
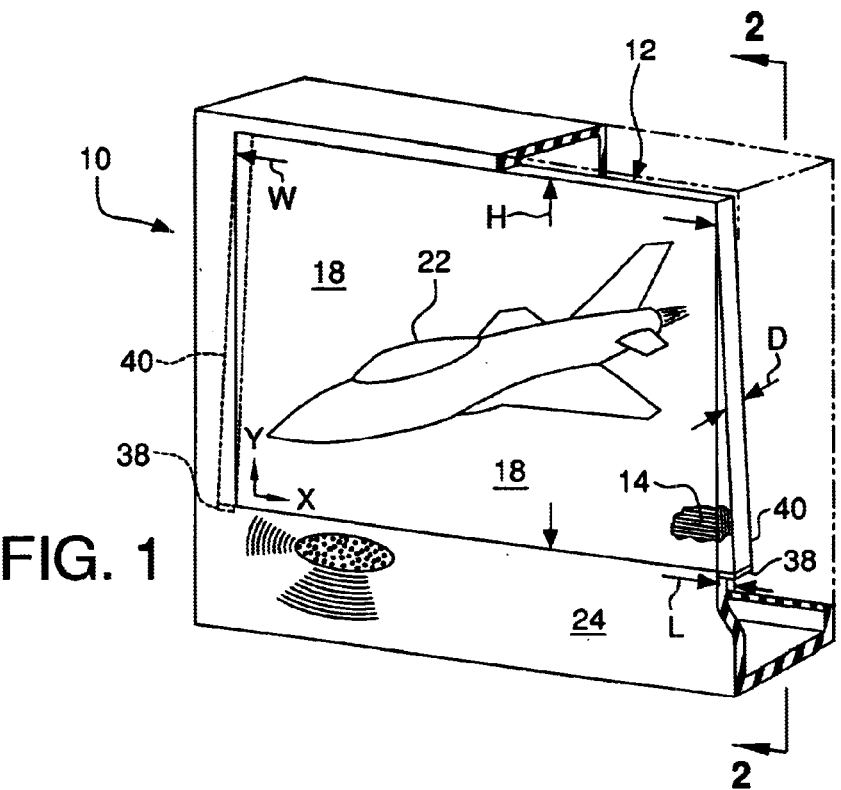
FIG. 1 is a partly sectional, front isometric view of an interactive display system in accordance with an exemplary embodiment of the present invention.

Illustrated in FIG. 1 is an interactive display system 10 in accordance with an exemplary embodiment of the present invention. The display system 10 is an assembly of components including a optical display panel 12 which includes a plurality of ribbon optical waveguides 14 which extend the full lateral or horizontal width W of the panel 12, and are stacked together vertically or transversely to define the full height H of the panel 12.

Figure 2:
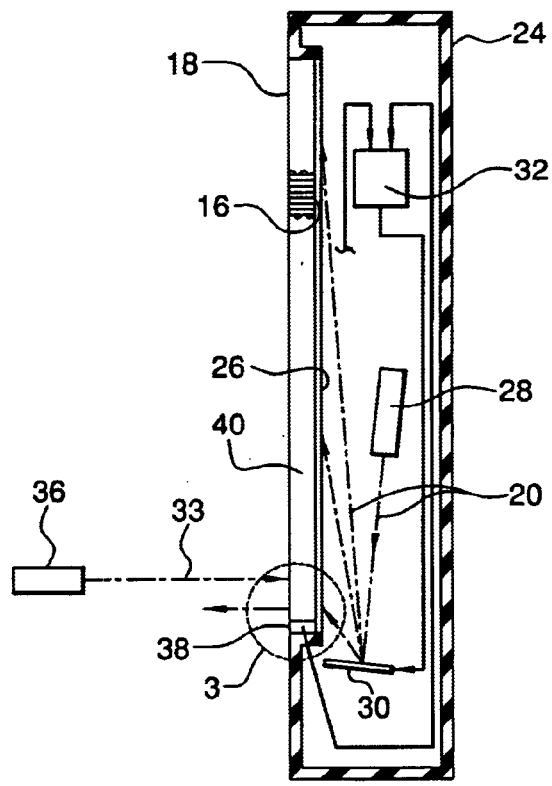
FIG. 2 is a partly sectional, side elevational view of the display system illustrated in FIG. 1 and taken along line 2—2 in FIG. 1.

The optical panel 12 may have any conventional form with the waveguides being arranged in various manners such as the wedge of decreasing size shown in U.S. Pat. No. 5,381,502, issued to Veligdan. As shown in FIG. 2, the waveguides 14 preferably have substantially identical size and are stacked vertically together in a column having first or back ends thereof collectively defining a planar inlet face 16, and opposite second or front ends thereof collectively defining a planar viewing outlet face 18.

Figure 3:
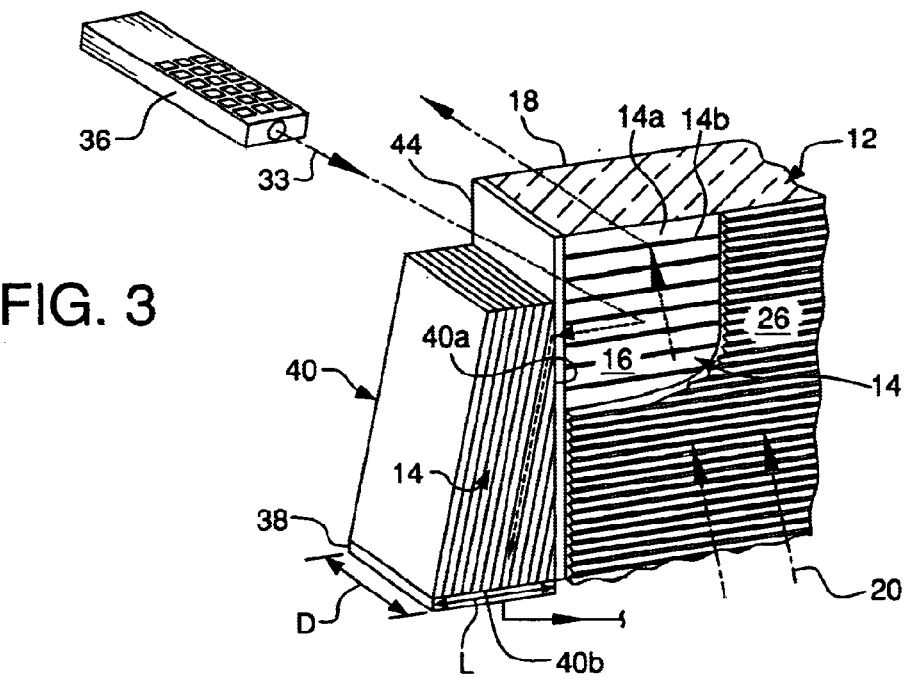
FIG. 3 is a partly sectional, enlarged view of a portion of the back of the display system illustrated in FIG. 2 and taken within the dashed circle labeled 3 in FIG. 2.

As shown in more detail in FIG. 3, each waveguide 14 includes an optically transparent core 14a disposed between cladding layers 14b. Due to the difference of index of refraction between the core 14a and cladding 14b, an image light beam 20 may be channeled through the individual waveguides 14 with total internal reflection in a conventional manner. As shown in FIG. 2, the image beam 20 is projected on the inlet face 16 for display on the outlet face 18 as an image (or video image) 22 illustrated in FIG. 1.

As shown in FIG. 3, the cladding 14b is preferably a dark color (e.g. black) for enhancing the contrast of the image as seen by an observer or user interacting with the display system 10.

As initially shown in FIGS. 1 and 2, the various components of the display system 10 may be mounted in a suitable housing 24 which is preferably relatively thin for minimizing the space requirements for the display 10. Since the inlet face 16 extends the full width and height of the panel 12, it is desirable to additionally provide a light coupler 26 over the inlet face 16 for redirecting the incident image light 20 to minimize the depth requirement of the housing 24.

In a preferred embodiment, the coupler 26 comprises Fresnel prismatic microscopic grooves which are straight along the full width of the panel 12 and spaced vertically apart along the height of the panel 12. A preferred form of the coupler 26 is a Transmissive Right Angle Film (TRAF) commercially available from the 3M Company of St. Paul, Minn., under the trade name TRAF II. This TRAF film permits the image light 20 to be projected at a small acute angle over the back of the optical panel 12, and then redirected up to about 90 degrees for channeling through the waveguides 14 for display from the outlet face 18. Other types of couplers of the types mentioned in U.S. Pat. No. 6,301,417, issued to Biscardi et al, may be alternatively employed. Alternatively, the coupler 26 may be eliminated, and the image beam may be aimed directly at the inlet face in typical rear-projection fashion.

The optical panel 12 may have any suitable configuration utilizing a plurality of stacked optical waveguides in which light may be transmitted in either direction between the inlet face and outlet face sides thereof. As shown schematically in FIGS. 2 and 4, the optical panel 12 is mounted in the housing 24 for cooperating with a suitable light projector 28 having any conventional configuration for projecting the light used in forming any desired video image 22. The light exiting the projector 28 is preferably in the form of a beam, rather than diffuse light.

For example, the projector 28 may include a lamp for producing white light which is projected through suitable projection lenses for use in creating any desired video image 22 on the outlet face 18. Color may be added to the light beam by, for example, rotating a conventional color wheel in a known manner inside or outside the projector 28.

The projector 28 preferably cooperates with a digital imaging device 30 for digitally creating the desired video image. Any suitable digital imaging device can be used, but a Digital Micromirror Device (DMD) imaging device 30 is preferred. The DMD 30 is an imaging device optically aligned between the projector 28 and the inlet face 16 which selectively reflects the image beam 20 through a cooperating projection lens (not shown) to form the video image. The imaging device 30 is a small semiconductor light switch including an array of, for example, thousands of microscopically sized image mirrors (not shown) each mounted on a hinge for being individually tilted back and forth, typically with an angular range of plus or minus 10 degrees when activated. When inactive, the individual micromirrors assume an intermediate relaxed position. The DMD 30 is a conventional device commercially available from Texas Instruments Inc. of Dallas, Tex. for use in digital light processing in creating digital images for various applications.

Figure 4:
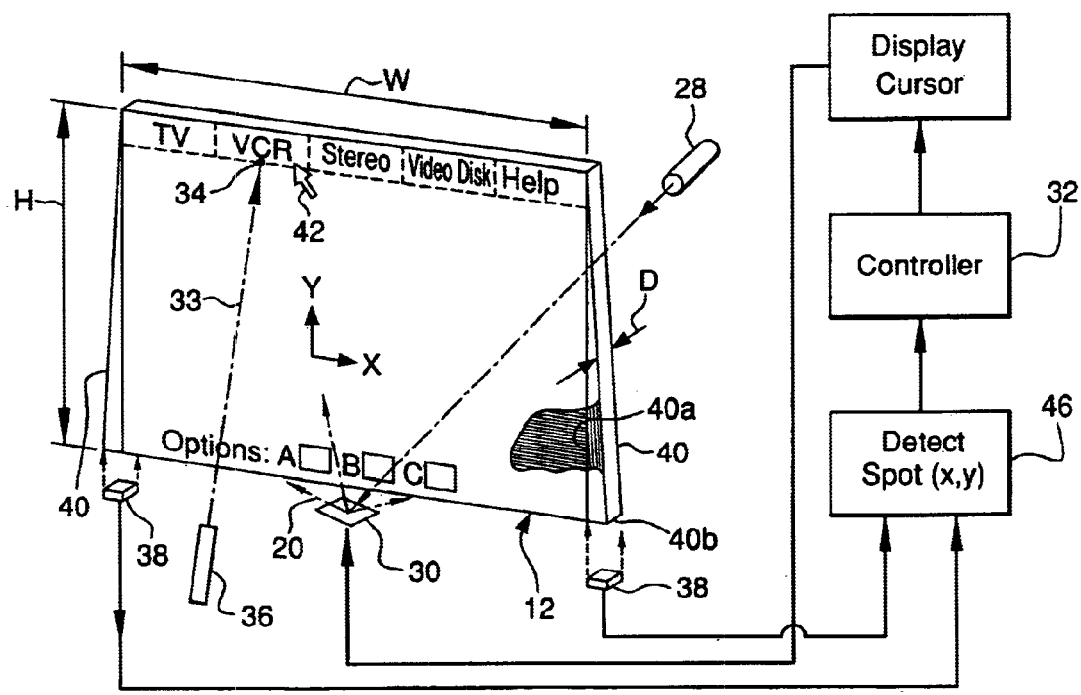
FIG. 4 is a front isometric view of the display system illustrated in FIGS. 1–3 in conjunction with a flowchart representation of its control elements in accordance with an exemplary embodiment of the present invention.

The DMD imaging device 30 is illustrated schematically in FIG. 4 in cooperation with an exemplary conventional electrical controller 32 which is used to independently control each of the thousands of micromirrors therein. The imaging device 30 is operatively coupled to the controller 32 through a suitable electronic driver (not shown) for controlling operation thereof and the form of the video image 22 displayed on the panel 12.

The controller 32 may take any conventional configuration such as a digital microprocessor programmed with suitable software for displaying any desired video image for any suitable purpose. The controller 32 may be used for displaying ordinary television video images from the panel 12, or other video images typically displayed on computer monitors, automated teller machines (ATM), etc. And, the controller 32 may be operatively coupled to the various components of the display system 10 using conventional electrical interfaces and drivers as required.

For purposes of this disclosure, the term "outbound" is defined as the direction from the inlet face 16 towards the outlet face 18, and the term "inbound" is defined as the direction from the outlet face 18 towards the inlet face 16.

FIG. 4 illustrates the basic operation of the display system of the present invention in which the controller 32 suitably operates the associated electronic driver for positioning the various micromirrors in the imaging device 30 for creating any desired video image 22 projected on the outlet face 18. The imaging device 30 spatially and temporally modulates the light beam emitted from the projector 28 for creating the image beam 20 which is preferably suitably imaged through projection optics (not shown) and redirected through the light coupler 26 for transmission outbound through the optical panel for display on the outlet face 18.

Since the optical panel 12 permits light transmission either outbound therethrough or inbound therethrough, the same panel may be used for both displaying any desired video image and providing interactive capability to a user. The exemplary video image illustrated in FIG. 4 is a menu of suitable choices which may be selected by the user for any desired application. For example, the optical panel may be part of a projection TV, computer monitor, or ATM machine which receives instructions from the intended user. Instead of providing a separate and dedicated keyboard for interacting with the system, the optical panel 12 itself may be used in accordance with the present invention.

In response to the image beam generated menu illustrated in FIG. 4, an inbound probe light beam 33 in the form of a light spot 34 is suitably formed on the panel at a selected lateral position X along the width of the outlet face 18 and transverse position Y along the height of the outlet face for identifying the desired menu choice.

In a preferred embodiment, a battery powered, remote optical pointer 36 is configured for emitting the probe light beam 33 which is simply aimed and pointed toward the outlet face to define a visible or invisible light spot positionable at any location over the entire outlet face. For example, the pointer may include a light emitting diode (LED) for emitting an infrared (IR) laser light beam invisible to the user.

A suitable light detector 38 may then be used to bridge the stacked height of the waveguides 14 for detecting the lateral and transverse location (X,Y) on the outlet face of the light spot 34. Since the panel may be quite large and includes a multitude of stacked waveguides, it is desirable to detect the spot with a relatively small light detector.

Accordingly, the light detector is made as short as practical, and is preferably shorter than the panel height. And, the light detector is suitably mounted inside the display housing in close proximity to the panel.

However, in order to provide full-height or effective coverage of the panel, a channeling element 40 is provided to cooperate with the preferably relatively small detector for channeling (e.g. converging or funneling) the inbound light from the outlet face to the detector. The channeling element may have any suitable form to optically bridge the detector across the waveguides along the panel height for providing effective coverage of light detection from the outlet face.

Optionally, the inbound (e.g. IR) probe beam may be modulated to enhance the ability of the detector to discriminate the inbound probe beam from background or extraneous light normally entering the outlet face 18 during operation or found in the panel 12 from the image beam 20 itself. Alternatively, temporal and/or spatial uncoupling of the inbound probe beam from the outbound image beam (which may, for example, comprise both visible and IR light) may instead (or additionally) be employed for discrimination purposes.

Since the light spot 34 is preferably invisible IR light, interactive feedback to the user is desired. Accordingly, the controller 32 is operatively coupled with both the imaging device 30 and the detector 38 for providing conspicuous and visible interactive feedback to the user. The controller is preferably configured in suitable software for driving the imaging device 30 to display an indicator (e.g. a visible cursor 42) on the outlet face corresponding with the detected location of the spot. The cursor 42 is a corresponding portion of the video image 22 being displayed, and may have any suitable form such as a small arrow for indicating position within the outlet face.

Since the spot 34 is preferably invisible, the controller determines the location thereof on the screen using the light detector 38 and then drives the imaging device 30 to produce the visible cursor 42 corresponding with the position of the spot on the outlet face. That correspondence or mapping of the cursor 42 to the spot 34 may have various forms including identical or coincident mapping to the location of the spot wherever the spot may be moved over the screen, or may be non-coincident therewith.

The bidirectional light transmission capability of the optical panel illustrated in FIG. 4 permits various embodiments for interactive control thereof. The waveguides 14 extend laterally across the full width of the panel, and are laminated or stacked together vertically or transversely along the full height of the panel and define opposite inlet and outlet faces through which light may be transmitted.

The light detector 38 and cooperating channeling element 40 may therefore bridge the waveguides along the partial or full height of the panel to define on the outlet face an invisible virtual target or zone inside which the lateral and transverse location of the spot 34 can be detected by the detector 38. Since the waveguides 14 are continuous, the channeling element may be located at any convenient location along the panel, either along the back side, or edges thereof. And, the outlet face 18 is preferably suitably configured (e.g. by an integral diffuser or by an additional diffusing element) for diffusing both the outbound beam forming the viewing image, and the inbound probe beam for being scattered inside the waveguides to reach the detector. The diffusing configuration is particularly useful when the detector is edge-mounted.

The channeling element 40 is illustrated in an exemplary embodiment in FIGS. 3 and 4, and includes a channeling inlet face 40a bridging an area of the waveguides 14, and a smaller channeling outlet face 40b bridging an area of the detector 38.

In the exemplary embodiment in FIGS. 3 and 4, the display system includes the optical panel 12 and the channeling element 40. The channeling element includes a plurality of secondary (auxiliary) optical waveguides 14 stacked together in a wedge, with first or beveled ends thereof defining the inlet face 40a adjoining the waveguides of the optical panel, and opposite ends thereof defining the outlet face 40b disposed substantially normal to the inlet face 40a.

The outermost waveguide in the channeling element 40 is the longest and preferably extends over substantially the full height of the panel. Each succeeding waveguide decreases in length, with the innermost waveguide in the channeling element being the shortest. And, the top of the channeling element has a small acute angle between the outermost waveguide and the inlet face 40a selected to correspond to the depth of the outlet face 40b with the small length L of the detector 38 cooperating therewith.

The waveguides 14 of both the optical panel and the channeling element are similarly constructed with optical cores 14a and cladding 14b for effecting total internal reflection of light therein. Whereas the optical panel is columnar with a vertical stack of waveguides, the channeling element is wedge-shaped that is preferably sized to substantially match the full height of the optical panel, yet with a relatively small depth (L) from the edge thereof for minimizing its size. Similar wedge-shaped channeling type elements of this form are described in more detail as panel 10 in U.S. Pat. No. 5,381,502, issued to Veligdan.

Since the inbound light 33 illustrated in FIG. 3 will scatter inside the optical panel upon entry therein, it will be dispersed laterally across the full length of the corresponding waveguides. When the light reaches the edges of the panel it will be redirected downwardly through the channeling element to reach the detector.

The channeling element preferably also includes another light coupler 44 optically interconnecting the waveguides of the panel and the waveguides of the channeling element at the junction with the inlet face 40a. That coupler 44 may simply be a suitable surface finish, such as frosting, on the waveguide ends of the optical panel to diffuse the light, with the inlet face 40a being optically transparent for receiving that light with minimum loss. Alternatively, other types of couplers (e.g. of the types mentioned above for coupler 26) may instead be utilized as coupler 44.

In a preferred embodiment, the coupler 44 comprises Fresnel prismatic microscopic grooves which are straight along the depth of the panel edges and spaced vertically apart along the height of the panel. The TRAF film identified above is preferred. In this way, at least a portion of the inbound light from the optical panel is redirected down through the channeling element at the bottom of which the redirected inbound light is detected by the detector 38.

Since the optical panel has opposite edges at which the stacked waveguides within the panel are exposed, the channeling element may adjoin either one of those edges for detecting the inbound light. One-edge detection of the inbound light may be used to accurately determine the transverse position Y of the inbound spot 34 as identified by the vertical position of the local waveguides in the optical panel through which the light is transmitted.

That light will be redirected through corresponding ones of the waveguides in the channeling element and detected at a corresponding location on the detector. In this way, full correspondence in position of the light spot at any vertical location on the outlet face 18 may be mapped to a corresponding location on the detector.

Lateral position (X) of the spot may be determined using the channeling element on only one edge of the optical panel by comparing the relative intensity of the detected light spot based on a reference value. The spot will be detected with maximum intensity closer to the channeling element edge of the optical panel than from the opposite edge thereof.

The light detector 38 illustrated in FIG. 4 may have any suitable configuration and is preferably in the form of a linear photodiode array bridging the waveguides at the outlet face 40b of the channeling element. A monolithic, self-scanning photodiode array having 1,024 diodes therein is commercially available from Hamamatsu Corporation of Japan.

This form of detector has a width of about 2 mm and a length L of about 20 mm, and may be used alone for covering the complete complement of waveguides in the channeling element, which in turn cover the full complement of waveguides in the optical panel over its full height H, for in turn providing full height coverage, with a single miniature detector. Since the detector need only bridge the ribbon waveguides of the channeling element, it may be equal to or less than the thickness or depth D of the channeling element and optical panel, which may be about 6 mm for example.

One or more of the individual photodiodes in the single detector may be aligned with corresponding ones of the waveguides of the channeling element for detecting light therein. And, one or more of the waveguides in the channeling element may be aligned with corresponding ones of the waveguides of the optical panel. The correspondence between the number of waveguides in the optical panel and channeling element and with the number of photodiodes in the detector may be selected as desired for obtaining any desired accuracy of resolution of detection as warranted.

In this way, vertical or transverse position (Y) of the spot 34 in the optical panel may be readily determined by the corresponding lateral location of the specific photodiode detecting the correspondingly high intensity of the spot in the detector. Since the waveguides are continuous across the full width of the panel, the light spot may enter an individual waveguide at any lateral location while still being detected by the corresponding photodiodes at the base of the panel.

Although detecting vertical location (Y) alone of the spot 34 may be acceptable in some applications, detection also of the lateral or horizontal location (X) thereof is also desired for providing two-dimensional interactive capability over the outlet face. As discussed above, it may be possible to calibrate a single-side array of the photodiodes so that relative light intensity detection thereof may be used to determine the lateral location (X) of the spot.

However, in the preferred embodiment illustrated in FIG. 4, a pair of the channeling elements 40 adjoin respective ones of the opposite optical panel edges. A pair of the detector arrays 38 are optically coupled to respective outlet faces 40b of those channeling elements 40.

The two detector arrays 38 may be operatively coupled to a conventional electrical comparator 46 which compares the relative intensity of the spot 34 for corresponding photodiodes in the left and right detectors to determine the lateral position of the spot at the outlet face. If the spot 34 is near the horizontal middle of the outlet face, the two detectors 38 will detect substantially equal intensity indicating the location of the spot at the mid-width of the outlet face.

And, as the spot 34 is moved closer to the left detector 38, the detected intensity thereof will be greater in the left detector than the right detector, and vice versa as the spot 34 is moved to the right. In this way, both the lateral (X) and transverse (Y) location of the spot 34 may be provided to the controller 32 suitably coupled to the comparator 46 for accurately positioning the cursor 42 in direct response to the location of the detected spot 34.

The comparator 46 may have any conventional form, and cooperates with the controller 32 for providing a two dimensional identification of the spot location (X,Y) along the lateral and transverse dimensions of the outlet face corresponding to the width and height thereof. The controller, in turn, drives the imaging device 30 to display the interactive cursor 42 wherever (or in correspondence to where) the spot is moved over the outlet face. Correspondence of the cursor with the displayed menu options may then be used in a typical manner for interactive operation of the display system. Adjustments in the relative speed of the movement of the cursor as compared to the movement of the spot may be controlled by the controller through suitable software programming.

As indicated above, the controller 32 may be configured in any suitable manner for displaying a video image 22 in the form of a suitable menu for providing interactive capability. The exemplary menu illustrated in FIG. 4 has various categories including the various options in each of those categories. The user simply aims the pointer 36 toward the outlet face and moves the cursor 42 anywhere on the outlet face to select the desired interactive option provided by the controller. Selection may be effected in any suitable manner such as by programming the controller 32 to visually highlight any of the displayed options as the cursor is simply placed thereover.

Alternatively, the pointer 36 itself may be configured with one or more buttons thereon which may be pressed to change the modulation frequency of the emitted probe beam 33, which may be suitably detected by the light detectors and identified in the controller 32 as indicative of a selection being made by the user.

The particular advantage of the optical panel 12 disclosed above is its construction in any desired size from small to large by merely increasing the length of the individual waveguides and/or increasing the number thereof along the stacking height. The panel may be made relatively thin and provides enhanced contrast for projecting video images therethrough. The panel may be used without the optical coupler 26 with rear projection of the video image if desired. The advantage of using the optical coupler 26 is the ability to mount the projector obliquely behind the optical panel for reducing the overall thickness of the entire display system.

In the preferred embodiment, the probe spot is generated by the remote pointer 36, but could be otherwise generated. For example, the projector 28 may produce both visible and IR light, with at least a portion of the IR light being reflected back through the panel by simple finger touching of the outlet face. The screen may therefore be configured as a touchscreen with the inbound IR light spot 34 provided by a finger touch being detectable by the light detectors, and the cursor may be formed at the touch point (or at a location corresponding to that of the touch point), or eliminated if desired. The outlet face 18 may be covered, for example, with a finger, palm (or other body part), pencil eraser, stylus (i.e. preferably of blunt type), or paper (e.g. for bar-code reading purposes) for reflecting inbound at least a portion of the outbound projector light, the covering element either directly touching the outlet face 18 or providing a reflective surface spaced closely near the outlet face 18.

In the embodiment of FIGS. 1–4, the channeling elements 40 are disposed on the left and right edges of the panel, and the detector arrays 38 are disposed near the bottom thereof. The additional width required for the wedge-shaped channeling elements is relatively small, and these channeling elements may be conveniently hidden behind respective portions of the housing bezel surrounding the optical panel.

Figure 5:
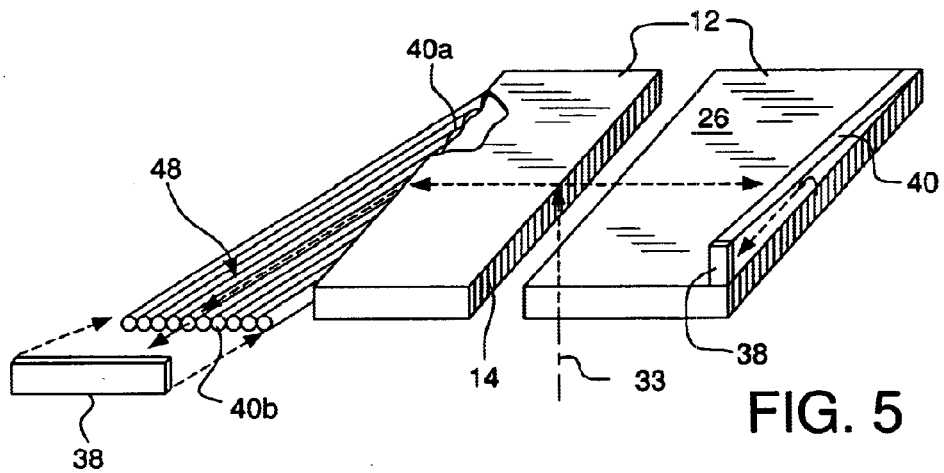
FIG. 5 is an isometric view of a portion of the display system in accordance with additional embodiments of the present invention.

FIG. 5 illustrates two additional embodiments of the present invention. On the right side of the figure, which is the left portion of the optical panel, the channeling element 40 adjoins the optical panel inlet face 16 along that left portion of the optical panel.

The light coupler 26 covering the optical panel inlet face 16 is used also for the channeling element 40 affixed thereto. In this way, different or the same portions of the light coupler 26 are used for redirecting the outbound image beam from the projector into the optical panel, and for redirecting the inbound light from the optical panel into the channeling element.

The channeling element is therefore conveniently hidden behind the optical panel toward the edge within the available space of the housing. Although FIG. 5 illustrates one channeling element 40 mounted behind the left portion of the optical panel, another channeling element may be mounted behind the right portion of the optical panel, with a cooperating detector array at its bottom for providing left and right symmetry of detection capability.

FIG. 5 also illustrates on the left side thereof another embodiment in which the channeling element comprises a plurality of optical fibers 48 arranged, for example, in a flat bundle having an overall ribbon form, with first ends thereof defining the inlet face 40a adjoining the waveguides 14 of the optical panel, and opposite ends thereof defining the outlet face 40b. The detector array 38 may then be optically coupled to the outlet face 40b of the optical fibers for detecting the inbound light from the optical panel.

The inlet ends of the optical fibers 48 may engage the edge of the optical panel substantially perpendicular thereto, or preferably may have a bevel engagement therewith as illustrated. Depending on the accuracy of resolution of detection desired, one or more of the individual photodiodes in the detector may be aligned with corresponding ones of the optical fibers. And, the optical fiber inlet ends may have any suitable registration with the waveguides of the optical panel, with preferably one or more optical fibers coupled to each waveguide. Suitable light coupling may be provided between the optical fibers and the waveguides by using the coupler 44 described above in any suitable form. In this way, the individual optical fibers are coupled to corresponding waveguides for transmitting the inbound light spot 34 to the cooperating detector array 38 for determining spot position.

Since the opposite edges of the optical panel have exposed portions of the stacked waveguides, the optical fibers may adjoin either one or both of those edges in left and right symmetry of detection if desired. The optical fibers may alternatively or additionally be mounted on the back side of the optical panel preferably along the left and/or right portions of the inlet face thereof.

Figure 6:
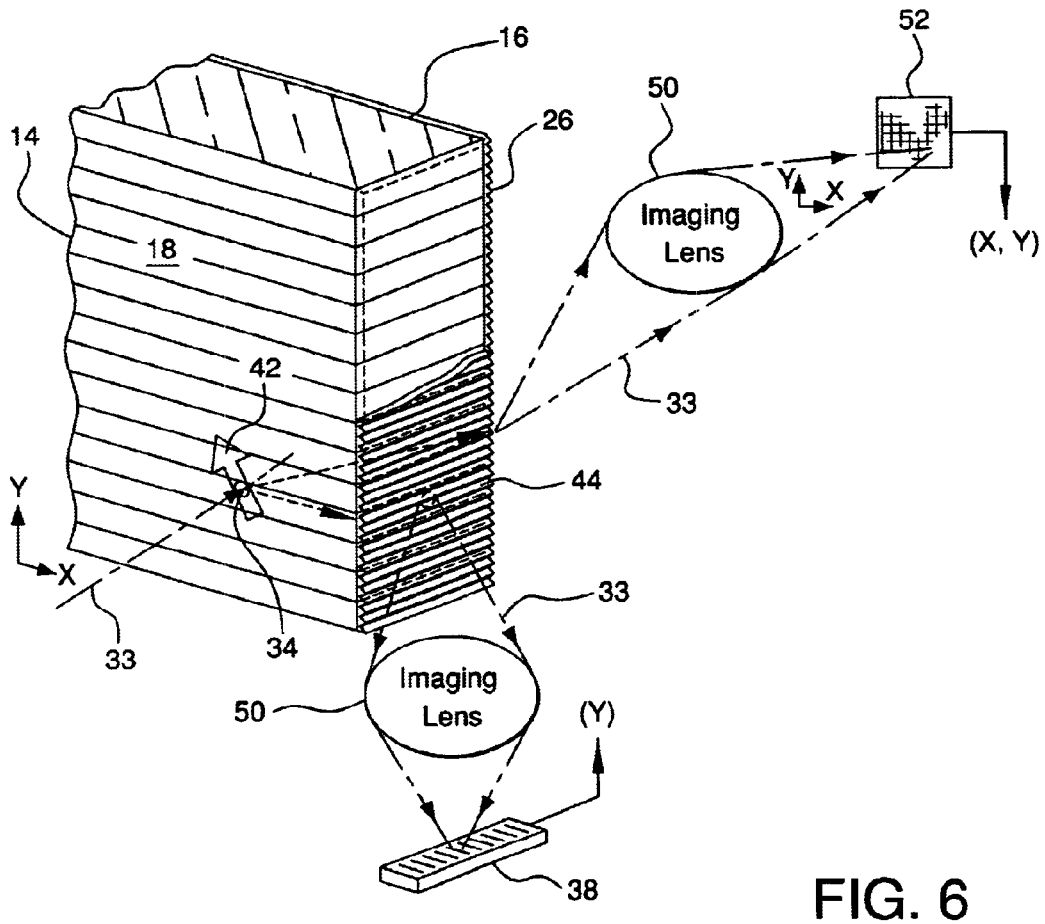
FIG. 6 is an isometric view of a portion of the display system in accordance with additional embodiments of the present invention.

FIG. 6 illustrates additional embodiments of the present invention. In these embodiments, the channeling element comprises an imaging lens 50 spaced between the panel and the optical detector. The imaging lens 50 may have any conventional form, and preferably includes a group or system of cooperating lenses (and possibly mirrors) such as those typically found in a camera.

The imaging lens is configured for imaging the inbound light spot from the waveguides to a corresponding location on the detector, and may be located in cooperation with either or both of the edges of the panel, and/or in cooperation with the back side or inlet face thereof (e.g. in cooperation with substantially the entire back side, or with either or both of the left and right portions of the back side of the panel). FIG. 6 illustrates both configurations.

In one configuration, the channeling element further comprises the light coupler 44 affixed to the edge of the waveguides for redirecting the inbound light spot 34 downwardly or upwardly toward the imaging lens to minimize the space requirements in the housing for mounting that lens. Since edge detection of the inbound light requires only the one-dimensional array of photodiodes in the linear detector 38, the imaging lens may be relatively simple, such as a cylindrical lens which preferably images substantially the entire height of the panel along its edge, and focuses that image down to the size of the detector 38. The transverse location (Y) of the spot may then be accurately determined, and the lateral location (X) may be determined as described above, preferably with an identical imaging lens and detector disposed at the opposite edge of the panel.

FIG. 6 illustrates another embodiment in which a single imaging lens 50 may be mounted behind the panel for imaging the entire surface area thereof. In this embodiment, a two-dimensional array detector 52 may be optically aligned with the imaging lens 50, and includes a two dimensional photodiode array for determining both a lateral (X) and transverse (Y) position of the inbound light spot at the outlet face 18 corresponding with a position of the photodiodes in the array.

Since the panel includes the light redirecting coupler 26 on its inlet face 16, the imaging lens 50 may be conveniently mounted near the top or bottom of the panel and relatively close thereto for imaging the entire surface thereof in a compact configuration within the limited volume of the housing.

The outbound image beam and the inbound/returning probe beam may both be transmitted within the same waveguide (within the panel or channeling element) and/or optical fiber. Alternatively, in any of the embodiments above, alternating ones of the waveguides and/or optical fibers may be dedicated for transmitting the outbound image beam and the (reflected) inbound probe beam. The optical detector may then be used for observing the dedicated inbound waveguides or optical fibers for detecting any inbound/returning probe light.

Accordingly, the display systems described above provide enhanced interactive capability with the simple introduction of the light channeling elements and cooperating optical detectors operatively coupled to the controller. Those detectors may be relatively quite small, yet capable of detecting the full height (and optionally width) of the panel using the various light channeling optical elements. The controller may be configured in any suitable software to provide the desired interactive capabilities based on the detection of the inbound light at the outlet face to control the projected video image thereat.

Since the detectors are relatively small or short compared to the overall height of the optical panel, the cost associated therewith is relatively small. And, therefore, interactive capability may be introduced into the display system with few additional components and with correspondingly little additional cost.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A display system, comprising:
    an optical panel including a plurality of optical waveguides stacked together, with first ends thereof defining an inlet face, and opposite ends thereof defining an outlet face, wherein said outlet face is substantially parallel to said inlet face;
    a projector that projects an image beam outbound across said inlet face for display on said outlet face;

an imaging device that images said image beam is optically aligned between said projector and said inlet face;

at least one optical detector that detects a location on said outlet face of an inbound light spot; and at least one channeling element that channels at least a portion of said light spot from said panel to said at least one detector.

2. A display system according to claim 1 further comprising a controller operatively coupled to said imaging device and said at least one detector, wherein said controller is configured for controlling said imaging device to display a visible indicator on said outlet face at a location corresponding to said detected spot location.

3. A display system according to claim 2 wherein said controller is further configured for controlling said imaging device to display said indicator at a location on said outlet face at substantially said detected spot location.

4. A display system according to claim 2 wherein said controller is further configured for controlling said imaging device to additionally display a menu on said outlet face and position said indicator on said menu in response to movement of said spot along said outlet face.

5. A display system according to claim 2 wherein said indicator is in the form of a visible cursor.

6. A display system according to claim 1 further comprising a remote pointer configured for emitting a light beam toward said outlet face to form said inbound light spot.

7. A display system according to claim 6 wherein said light beam emitted from said remote pointer comprises infrared light.

8. A display system according to claim 1 wherein said at least one channeling element optically couples said at least one detector to at least a portion of said waveguides.

9. A display system according to claim 8 wherein said at least one channeling element includes a channeling element inlet face optically coupled to at least a portion of said waveguides, and a channeling element outlet face optically coupled to an area of said at least one detector.

10. A display system according to claim 9 wherein said channeling element inlet face is larger in area than said channeling element outlet face.

11. A display system according to claim 9 wherein said channeling element inlet face is larger in area than an area of said at least one detector.

12. A display system according to claim 9 wherein said at least one channeling element comprises a plurality of auxiliary optical waveguides, with first ends thereof defining said channeling element inlet face, and opposite ends thereof defining said channeling element outlet face.

13. A display system according to claim 12 wherein said at least one channeling element further comprises a light coupler optically interconnecting said auxiliary waveguides and said waveguides of said optical panel.

14. A display system according to claim 12 wherein said optical panel includes opposite edges having exposed portions of said waveguides of said optical panel, and wherein said auxiliary waveguides are optically coupled to one of said optical panel edges.

15. A display system according to claim 14 further comprising:

a pair of said channeling elements optically coupled to respective ones of said optical panel edges; and a pair of said at least one detector optically coupled to respective channeling element outlet faces.

16. A display system according to claim 15 further comprising a comparator operatively coupled to said pair of detectors for comparing a relative intensity of said spot to determine a lateral position thereof along said outlet face.

17. A display system according to claim 14 wherein said auxiliary waveguides are optical fibers.

18. A display system according to claim 12 wherein said auxiliary waveguides are optically coupled to said optical panel inlet face along either a left or right portion thereof.

19. A display system according to claim 18 wherein said optical panel inlet face includes a light coupler thereat for redirecting said outbound image beam from said projector into said optical panel, and for redirecting said inbound light spot from said optical panel into said auxiliary waveguides.

20. A display system according to claim 18 wherein said auxiliary waveguides are optical fibers.

21. A display system according to claim 12 further comprising:

a pair of said channeling elements optically coupled to said optical panel inlet face along opposite left and right portions thereof; and a pair of said at least one detector optically coupled to respective channeling element outlet faces.

22. A display system according to claim 21 further comprising a comparator operatively coupled to said pair of detectors for comparing a relative intensity of said spot to determine a lateral position thereof along said outlet face.

23. A display system according to claim 12 wherein said auxiliary waveguides are in the form of ribbons.

24. A display system according to claim 23 wherein said auxiliary waveguides are stacked and are in the form of a wedge.

25. A display system according to claim 12 wherein said auxiliary waveguides are optical fibers.

26. A display system according to claim 8 wherein said at least one channeling element comprises an imaging lens optically aligned between said optical panel and said at least one detector.

27. A display system according to claim 26 wherein said imaging lens images said inbound light spot from said waveguides of said optical panel to a corresponding location on said at least one detector.

28. A display system according to claim 27 wherein said at least one detector comprises a linear photodiode array for determining a transverse position of said inbound light spot on said outlet face corresponding with a position of the photodiodes in said array.

29. A display system according to claim 27 wherein said at least one detector comprises a two-dimensional photodiode array for determining both a lateral and transverse position of said inbound light spot on said outlet face corresponding with a position of the photodiodes in said array.

30. A display system according to claim 27 wherein said at least one channeling element further comprises a light coupler optically aligned between said imaging lens and said waveguides of said optical panel for redirecting said inbound light spot toward said imaging lens.

31. A display system according to claim 30 wherein said coupler is located at an edge of said optical panel.

32. A display system according to claim 27 wherein said optical panel inlet face includes a light coupler thereat for redirecting said outbound image beam from said projector into said optical panel, and for redirecting said inbound light spot from said optical panel toward said imaging lens.

33. A display system according to claim 1 wherein each of said waveguides extends horizontally across the width of said panel, and said waveguides being stacked together vertically along the height of said panel, and wherein each of said waveguides is stacked without inclination.

34. A display system according to claim 33 wherein said at least one channeling element optically couples said at least one detector to at least a portion of said waveguides along said panel height.

35. A display system according to claim 33 wherein said at least one channeling element optically couples said at least one detector to substantially all of said waveguides along said panel height to thereby provide corresponding, substantially full-height coverage of said outlet screen.

36. A display system according to claim 1 wherein said at least one channeling element bridges said panel along one edge of said panel.

37. A display system according to claim 1 wherein said at least one channeling element includes a pair of said channeling elements, wherein said pair of said channeling elements bridges said panel along opposite edges of said panel.

38. A display system according to claim 1 wherein said at least one detector comprises a linear photodiode array for determining a transverse position of said inbound light spot on said outlet face corresponding with a position of the photodiodes in said array.

39. A display system according to claim 1 wherein said waveguides of said optical panel are in the form of ribbons.

40. A display system according to claim 1 wherein said inbound light spot is formed by covering a spot on said outlet face with at least one covering element selected from the group consisting of finger, palm, pencil eraser, stylus, and paper.

41. A display system according to claim 40 wherein said covering element reflects at least a portion of said image beam inbound through at least one waveguide to thereby provide said inbound light spot.

42. A display system according to claim 40 wherein said covering element reflects at least a portion of said image beam into an adjoining waveguide to thereby provide said inbound light spot.

43. A display system according to claim 40 wherein said covering element is in contact with said outlet face.

44. A display system according to claim 40 wherein said covering element is spaced from said outlet face.

45. A display system, comprising:
an optical panel including a plurality of optical waveguides stacked together, with first ends thereof defining an inlet face, and opposite ends thereof defining an outlet face;
a projector that projects an image beam outbound across said inlet face for display on said outlet face;
an imaging device that images said image beam is optically aligned between said projector and said inlet face;
at least one optical detector that detects a location on said outlet face of an inbound light spot; and
at least one channeling element that channels at least a portion of said light spot from said panel to said at least one detector;
wherein each of said waveguides extends horizontally across the width of said panel, and said waveguides being stacked together vertically along the height of said panel, and wherein each of said waveguides is stacked without inclination.

46. A display system, comprising:
an optical panel including a plurality of optical waveguides stacked together, with first ends thereof defining an inlet face, and opposite ends thereof defining an outlet face;
a projector that projects an image beam outbound across said inlet face for display on said outlet face;
an imaging device that images said image beam is optically aligned between said projector and said inlet face;
at least one optical detector that detects a location on said outlet face of an inbound light spot; and
at least one channeling element that channels at least a portion of said light spot from said panel to said at least one detector;
wherein said at least one channeling element includes a channeling element inlet face optically coupled to at least a portion of said waveguides, and a channeling element outlet face optically coupled to an area of said at least one detector.

47. A display system, comprising:
an optical panel including a plurality of optical waveguides stacked together, with first ends thereof defining an inlet face, and opposite ends thereof defining an outlet face;
a projector that projects an image beam outbound across said inlet face for display on said outlet face;
an imaging device that images said image beam is optically aligned between said projector and said inlet face;
at least one optical detector that detects a location on said outlet face of an inbound light spot; and
at least one channeling element that channels at least a portion of said light spot from said panel to said at least one detector;
wherein said at least one channeling element bridges said panel along one edge of said panel.

48. A display system, comprising:
an optical panel including a plurality of optical waveguides stacked together, with first ends thereof defining an inlet face, and opposite ends thereof defining an outlet face;
a projector that projects an image beam outbound across said inlet face for display on said outlet face;
an imaging device that images said image beam is optically aligned between said projector and said inlet face;
at least one optical detector that detects a location on said outlet face of an inbound light spot; and
at least one channeling element that channels at least a portion of said light spot from said panel to said at least one detector;
wherein said at least one channeling element includes a pair of said channeling elements, wherein said pair of said channeling elements bridges said panel along opposite edges of said panel.

49. A display system, comprising:
an optical panel including a plurality of optical waveguides stacked together, with first ends thereof defining an inlet face, and opposite ends thereof defining an outlet face;
a projector that projects an image beam outbound across said inlet face for display on said outlet face;
an imaging device that images said image beam is optically aligned between said projector and said inlet face;
at least one optical detector that detects a location on said outlet face of an inbound light spot; and
at least one channeling element that channels at least a portion of said light spot from said panel to said at least one detector;
wherein said at least one channeling element optically couples said at least one detector to at least a portion of said waveguides, and wherein said at least one channeling element comprises an imaging lens optically aligned between said optical panel and said at least one detector.

* * * * *